United States Patent
Kato

(10) Patent No.: US 8,508,558 B2
(45) Date of Patent: Aug. 13, 2013

(54) COLOR TEMPERATURE ADJUSTING DEVICE, METHOD FOR ADJUSTING COLOR TEMPERATURE, AND PROGRAM PRODUCT

(75) Inventor: Takeshi Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 12/904,223

(22) Filed: Oct. 14, 2010

(65) Prior Publication Data

US 2011/0096103 A1    Apr. 28, 2011

(30) Foreign Application Priority Data

Oct. 23, 2009 (JP) ................... P2009-244577

(51) Int. Cl.
*G09G 5/10* (2006.01)
(52) U.S. Cl.
USPC ............................... 345/690; 345/904
(58) Field of Classification Search
USPC ................... 345/690, 904; 348/179
See application file for complete search history.

(56) References Cited

U.S. PATENT DOCUMENTS

| | | | | |
|---|---|---|---|---|
| 5,499,040 A | * | 3/1996 | McLaughlin et al. | 345/904 |
| 6,686,953 B1 | * | 2/2004 | Holmes | 348/179 |
| 2006/0176311 A1 | * | 8/2006 | Kimoto et al. | 345/589 |
| 2009/0067711 A1 | * | 3/2009 | Sasaki | 382/167 |
| 2009/0243507 A1 | | 10/2009 | Lucero-Vera et al. | |

FOREIGN PATENT DOCUMENTS

| | | |
|---|---|---|
| JP | 2008-546017 | 12/2008 |
| JP | 2009-77312 | 4/2009 |

OTHER PUBLICATIONS

U.S. Appl. No. 60/686,501, filed Jun. 1, 2005.

* cited by examiner

*Primary Examiner* — Kevin M Nguyen
(74) *Attorney, Agent, or Firm* — Frommer Lawrence & Haug LLP; William S. Frommer

(57) ABSTRACT

A color temperature adjusting device includes a display unit that displays a first pointer indicating default values of chromaticity x, y and a second pointer indicating an adjustment value of the chromaticity x, y within a frame in a corresponding manner to scales of the x coordinate and the y coordinate marked on the frame, an operating unit that is used to change the x coordinate and/or the y coordinate of the second pointer, and a control unit that sends out the adjustment value indicated by the second pointer by an operation of the operating unit, to the monitor through a communication processing unit, and in a case where the monitor changes the color temperature, receives the values of the chromaticity x, y from the monitor through the communication processing unit so as to reflect and display the values of the chromaticity x, y on the display unit.

6 Claims, 14 Drawing Sheets

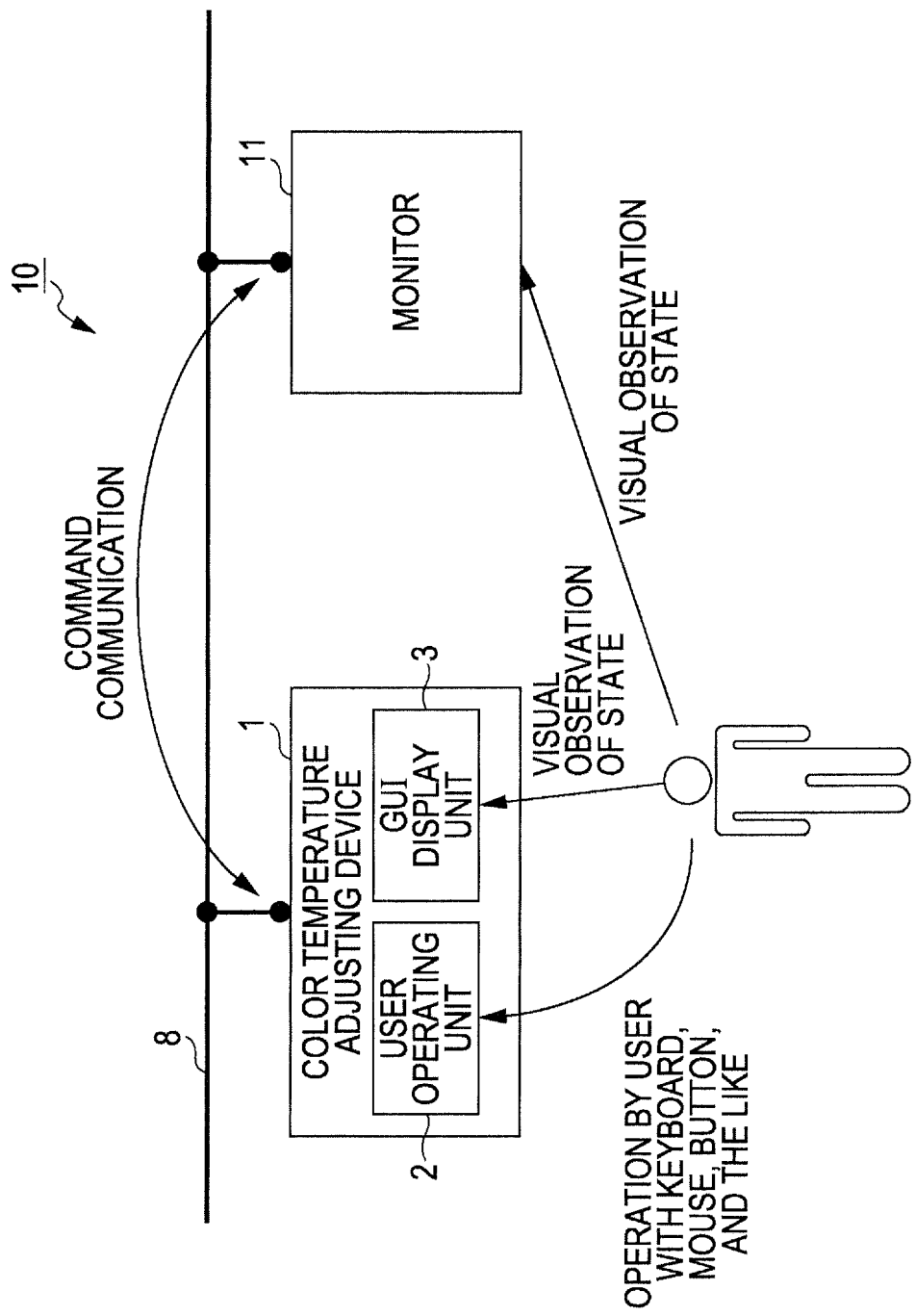

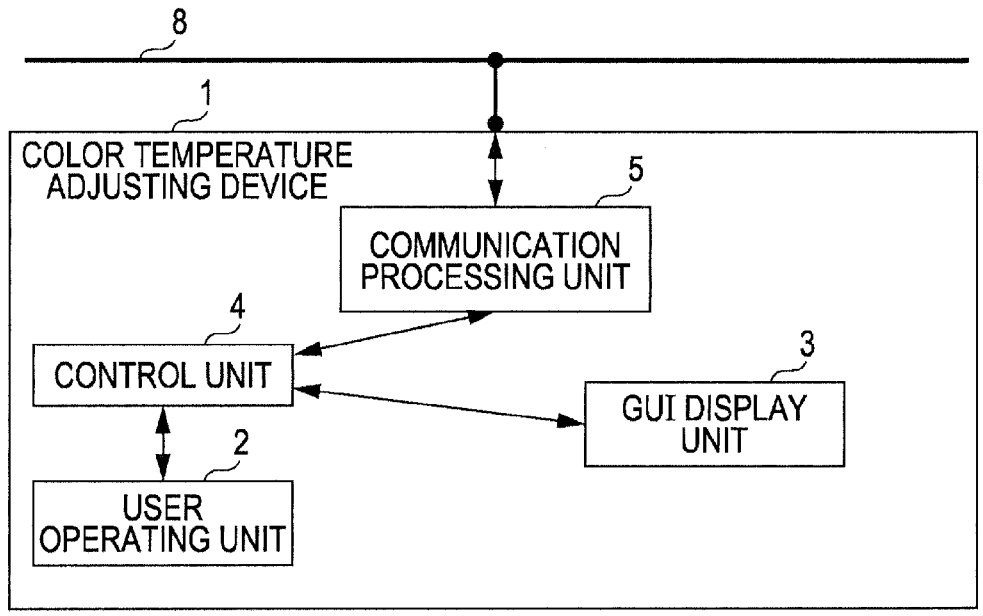
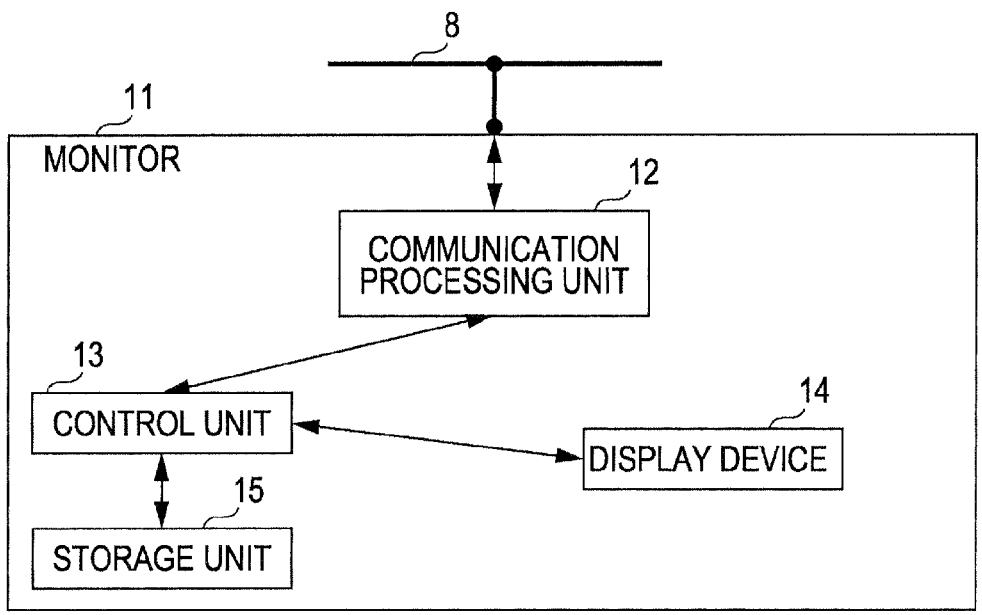

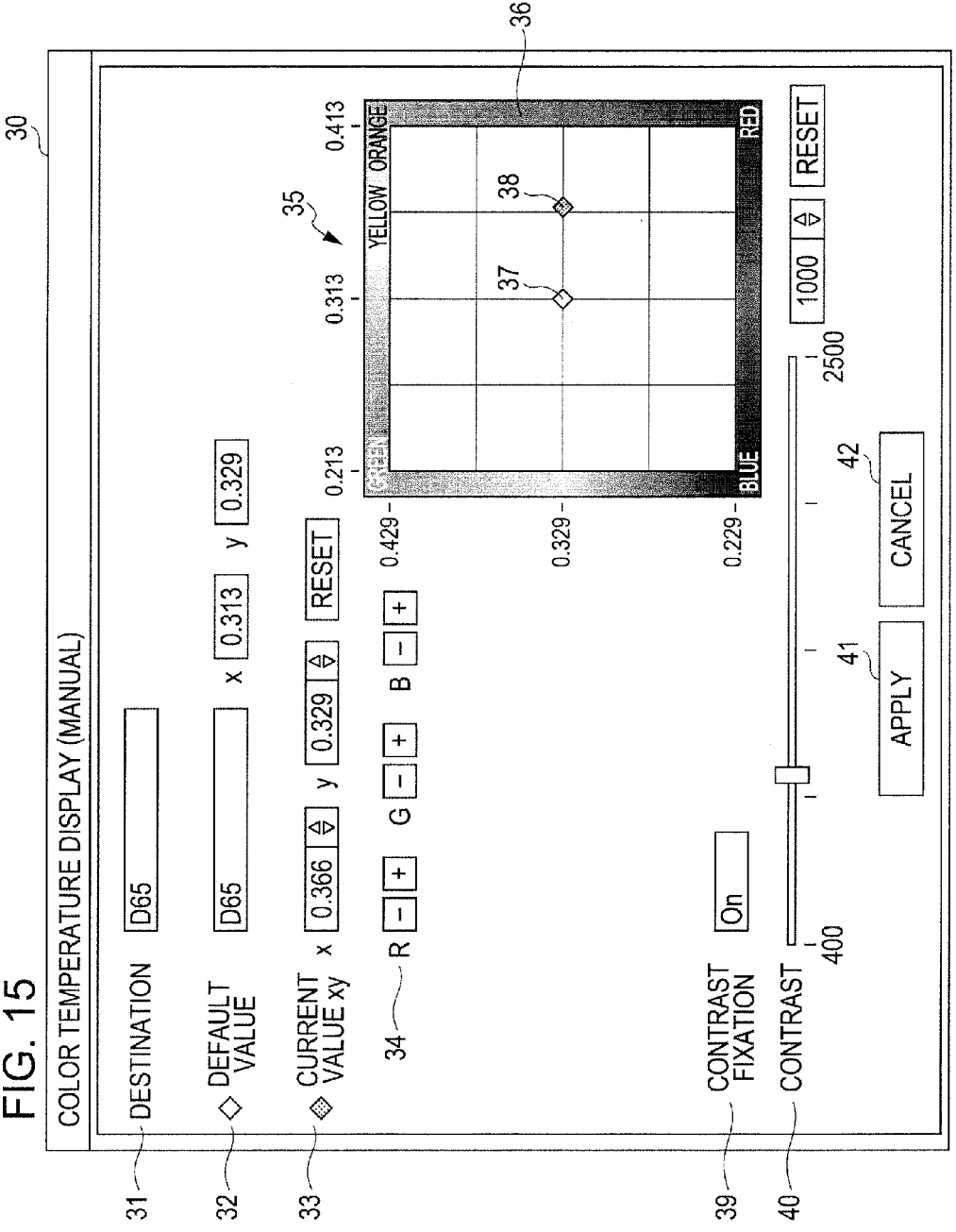

COLOR TEMPERATURE ADJUSTING DEVICE, METHOD FOR ADJUSTING COLOR TEMPERATURE, AND PROGRAM PRODUCT

BACKGROUND OF THE INVENTION

1. Field of the Invention

The present invention relates to a color temperature adjusting device, a method for adjusting a color temperature, and a program product that are desirably applied to a case of adjusting a color temperature of an image which is displayed on a monitor, for example.

2. Description of the Related Art

In related art, when a color temperature adjusting device changes values of R (red), G (green), and B (blue) (abbreviated below as RGB), a display device provided to a monitor changes values of chromaticity x, y and luminance Y so as to adjust a color temperature which is set in the monitor.

Here, a procedure that a related art color temperature adjusting device adjusts a color temperature of a display device is described.

The related art color temperature adjusting device transmits relative change values of RGB to a monitor so as to permit a user to easily recognize a color changing direction. The monitor recalculates values of chromaticity x, y and luminance Y based on the relative change values of RGB and displays an image on a display device. Then, the user operates the color temperature adjusting device while recognizing the color changing direction by looking at the image displayed on a screen of the monitor, thus adjusting a color temperature of the display device.

Japanese Unexamined Patent Application Publication No. 2009-77312 discloses a technique that values of RGB are converted into values of chromaticity x, y and luminance Y and the values of the chromaticity x, y and the luminance Y are outputted as setting values of a color temperature.

SUMMARY OF THE INVENTION

However, only by changing values of the chromaticity x, y, it is difficult for a user to recognize which direction a real color changing direction is in among a red direction, a green direction, and a blue direction, from the changed value. Further, when a monitor calculates the chromaticity x, y and the luminance Y from the values of RGB, a control unit included in the monitor performs a floating-point arithmetic. Thus, after the color temperature adjusting device transmits the relative change values of RGB to the monitor, the control unit performs the floating-point arithmetic, taking time until the display device reflects the change of the color to an image. Further, the values of the chromaticity x, y and the luminance Y updated in the monitor are not sent back to the color temperature adjusting device, so that the color temperature adjusting device does not get the values of the chromaticity x, y and the luminance Y set in the monitor. Accordingly, the user has had a difficulty to recognize changing relationships between the relative change values of RGB and the chromaticity x, y and between the relative change values of RGB and the luminance Y. Thus, operability of the color temperature adjusting device has been poor, as well.

It is desirable to provide a color temperature adjusting device, a method for adjusting a color temperature, and a program product that can easily adjust a color temperature which is set in a monitor.

An embodiment of the present invention displays a first pointer and a second pointer within a frame that displays colors corresponding to an x coordinate and a y coordinate in an xy chromaticity diagram among colors shown in an inside of a triangle boundary line drawn by connecting chromaticity points of three primary colors in the xy chromaticity diagram.

The first pointer indicates default values of chromaticity x, y denoting a color temperature that is set in a default state of a monitor that displays an image. The second pointer indicates an adjustment value of the chromaticity x, y of the monitor in which the color temperature is adjusted. The first pointer and the second pointer are displayed on a display unit in a corresponding manner to scales of the x coordinate and the y coordinate marked on the frame.

The x coordinate and/or y coordinate of the second pointer displayed within the frame are changed, an adjustment value indicated by the second pointer, the x coordinate and/or y coordinate of which are/is changed by an operation of an operating unit, is sent to the monitor through a communication processing unit.

A color temperature adjusting device receives the values of the chromaticity x, y set in the monitor from the monitor through the communication processing unit in a case where the color temperature adjusting device changes the color temperature based on the values of the chromaticity x, y set by the adjustment value.

The color temperature adjusting device reflects and displays the values of the chromaticity x, y received from the monitor on the display unit as values of the chromaticity x, y set in the monitor that is in adjustment.

Accordingly, the color temperature adjusting device directly sends the values of the chromaticity x, y to the monitor, and a user can recognize the values of the chromaticity x, y set in the monitor while adjusting a color temperature of the monitor.

According to the embodiment of the present invention, the color temperature adjusting device directly sends the changed values of the chromaticity x, y to the monitor without performing a floating-point arithmetic of the relative change values of RGB and reflects the values of the chromaticity x, y sent back from the monitor to displacement of the second pointer, which is displayed on the display unit, with respect to the first pointer. Accordingly, the user can adjust the color temperature of the monitor by an intuitive operation as moving the second pointer, effectively enhancing operability of the color temperature adjusting device.

BRIEF DESCRIPTION OF THE DRAWINGS

FIG. 1 is a block diagram showing a configuration example of a color temperature adjusting system according to an embodiment of the present invention;

FIG. 2 is a block diagram showing an internal configuration example of a color temperature adjusting device according to the embodiment of the present invention;

FIG. 3 is a block diagram showing an internal configuration example of a monitor according to the embodiment of the present invention;

FIG. 15 illustrates an example of the color temperature manual-adjustment setting screen according to the embodiment of the present invention.

DESCRIPTION OF THE PREFERRED EMBODIMENTS

Figure 4:
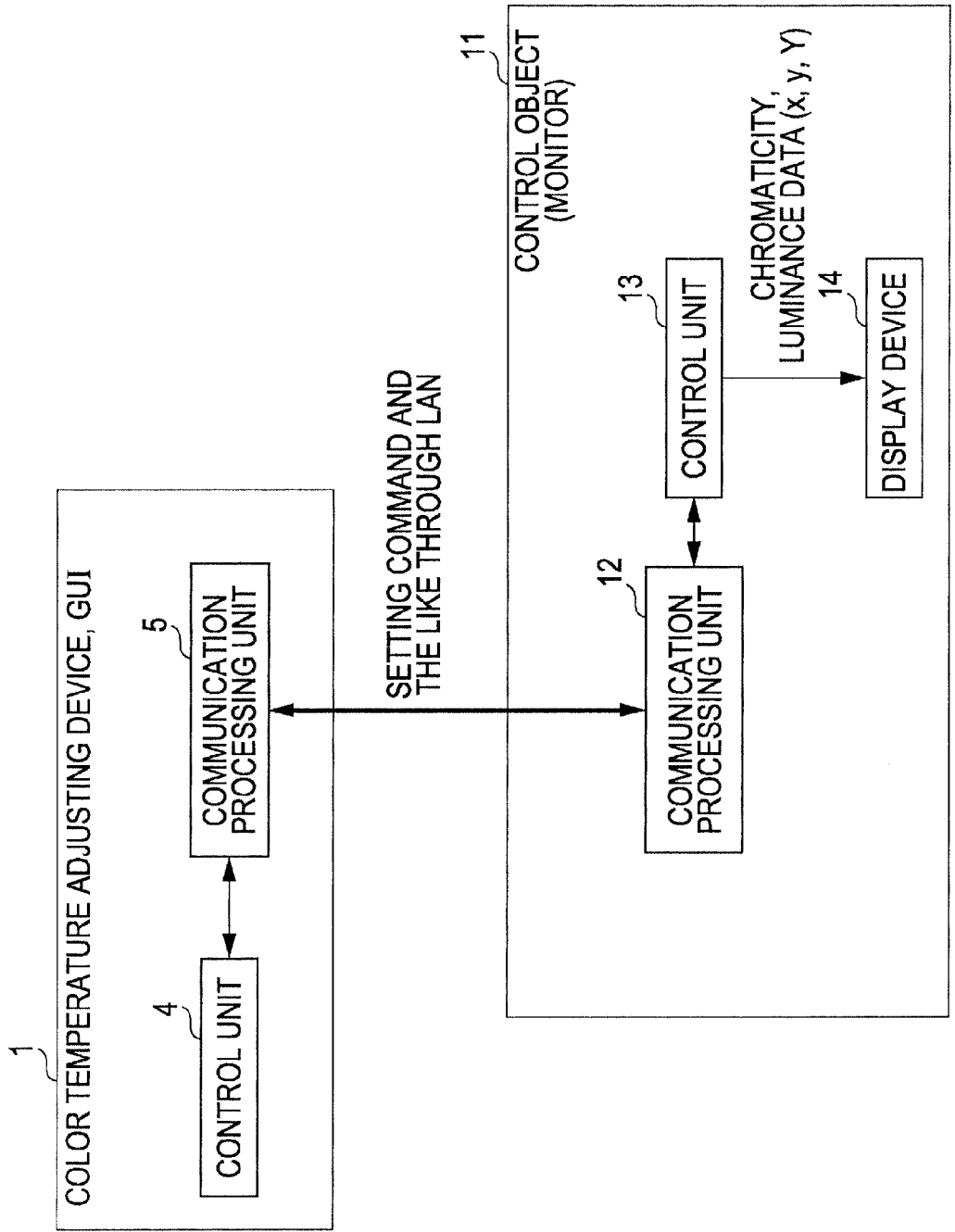
FIG. 4 is a block diagram showing an example of command communication processing between the color temperature adjusting device and the monitor according to the embodiment of the present invention.

An embodiment of the present invention will be described in the following order.
1. Embodiment (Control of Adjusting Color Temperature of Monitor: Configuration Example of Color Temperature Adjusting System)
2. Modification <1. Embodiment>

[Configuration Example of Color Temperature Adjusting System]

An embodiment of the present invention will be described hereinafter with reference to the accompanying drawings. In the embodiment of the present invention, a color temperature adjusting system 10 in which a user operates a color temperature adjusting device to adjust a color temperature which is set in a monitor will be described as an example.

FIG. 1 illustrates a configuration example of the color temperature adjusting system 10 of the embodiment of the present invention.

The color temperature adjusting system 10 includes a monitor 11 that displays an image, a color temperature adjusting device 1 that adjusts a color temperature which is set in the monitor 11, and a local area network (LAN) 8 that connects the color temperature adjusting device 1 and the monitor 11. Ethernet® is used as the LAN 8, for example. Through the LAN 8, the color temperature adjusting device 1 can transmit a predetermined command to the monitor 11 and the monitor 11 can transmit a reply to the color temperature adjusting device 1.

The color temperature adjusting device 1 further includes a user operating unit 2 that receives an operation of a user through a keyboard, a mouse, or a button, for example, and outputs an operation signal, and a graphical user interface (GUI) display unit 3 that displays a change of a color temperature, which is set in the monitor 11, on a screen thereof. The GUI display unit 3 GUI-displays an adjustment screen of a color temperature, enabling a user's intuitive operation.

In the color temperature adjusting system 10, the color temperature adjusting device 1 principally communicates with the monitor 11 by using a uniquely-defined command. The user operates the user operating unit 2 while looking at a color temperature manual-adjustment setting screen 30 (refer to FIG. 8 mentioned later) that is displayed on the GUI display unit 3 and used to adjust a color temperature, so as to adjust a color temperature of the monitor 11. Then, the color temperature adjusting device 1 transmits a predetermined command for changing the color temperature to the monitor 11. The monitor 11 sets the color temperature based on the command received from the color temperature adjusting device 1 to display an image, and transmits data about the color temperature set in the monitor 11 back to the color temperature adjusting device 1. The color temperature adjusting device 1 displays a current state of the color temperature, which is set in the monitor 11, on the GUI display unit 3 based on the data about the color temperature received from the monitor 11.

FIG. 2 illustrates an internal configuration example of the color temperature adjusting device 1.

In addition to the user operating unit 2 and the GUI display unit 3, which are described above, the color temperature adjusting device 1 includes a control unit 4 that overall controls each unit. The color temperature adjusting device 1 further includes a communication processing unit 5 by which the color temperature adjusting device 1 communicates with the monitor 11. The communication processing unit 5 shapes a command issued by the control unit 4 into a predetermined format to send it out to the LAN 8 and takes data out of a reply received from the monitor 11 through the LAN 8.

The GUI display unit 3 displays a color temperature set in the monitor 11 as described later. Therefore, a user can adjust a color temperature of the monitor 11 by looking at the color temperature manual-adjustment setting screen 30 displayed on the GUI display unit 3.

FIG. 3 illustrates an internal configuration example of the monitor 11.

The monitor 11 includes a communication processing unit 12 that communicates with the color temperature adjusting device 1, a control unit 13 that overall controls each unit, and a display device 14 that regulates a color temperature and displays an image on a screen which is not shown. The monitor 11 further includes a storage unit 15 that stores a default value (for example, a destination described later) for setting a color temperature of the display device 14 and various kinds of setting values.

The display device 14 is composed of a liquid crystal panel module and the like. The liquid crystal panel module and the like uses an LED backlight and the like of which a color temperature is regulated by chromaticity x, y and luminance Y which are set by the color temperature adjusting device 1.

The control unit 13 is composed of a CPU and the like, for example. The control unit 13 changes the color temperature set in the display device 14 based on the command received from the color temperature adjusting device 1 through the communication processing unit 12 so as to change a display of an image displayed on the screen.

FIG. 4 illustrates an example of communication processing between the color temperature adjusting device 1 and the monitor 11.

The color temperature adjusting device 1 performs the communication processing as the following.

The control unit 4 sends out an adjustment value which is indicated by a second pointer 38 (refer to FIG. 8 mentioned later), the x coordinate and y coordinate of which are changed by an operation of a user with the user operating unit 2, to the monitor 11 through the communication processing unit 5. When the monitor 11 changes the color temperature based on values of the chromaticity x, y and the luminance Y set by the adjustment value, the control unit 4 receives the values of the chromaticity x, y and the luminance Y set in the monitor 11 from the monitor 11 through the communication processing unit 5. Then, the control unit 4 performs control such that the control unit 4 reflects and displays the chromaticity x, y and the luminance Y received from the monitor 11 on the display unit as values of the chromaticity x, y set in the monitor 11 which is in adjustment.

Specifically, the color temperature adjusting device 1 communicates with the monitor 11 through the LAN 8 so as to display a state of the color temperature, which is set in the monitor 11, on the GUI display unit 3. Further, the color temperature adjusting device 1 regularly communicates with the monitor 11 so as to grasp a communication state of the LAN 8 and recognize a state of the color temperature which is set in the monitor 11.

The color temperature adjusting device 1 issues a predetermined command to the monitor 11, when the color temperature adjusting device 1 communicates with the monitor 11 or when a user operates the color temperature adjusting device 1 to adjust a color temperature of the monitor 11. The monitor 11 changes various kinds of settings of the display device 14 and the state of the color temperature based on the command. Further, the color temperature adjusting device 1 displays the color temperature manual-adjustment setting screen 30 which is GUI-displayed by the GUI display unit 3 and the control unit 4 performs command processing.

Figure 5:
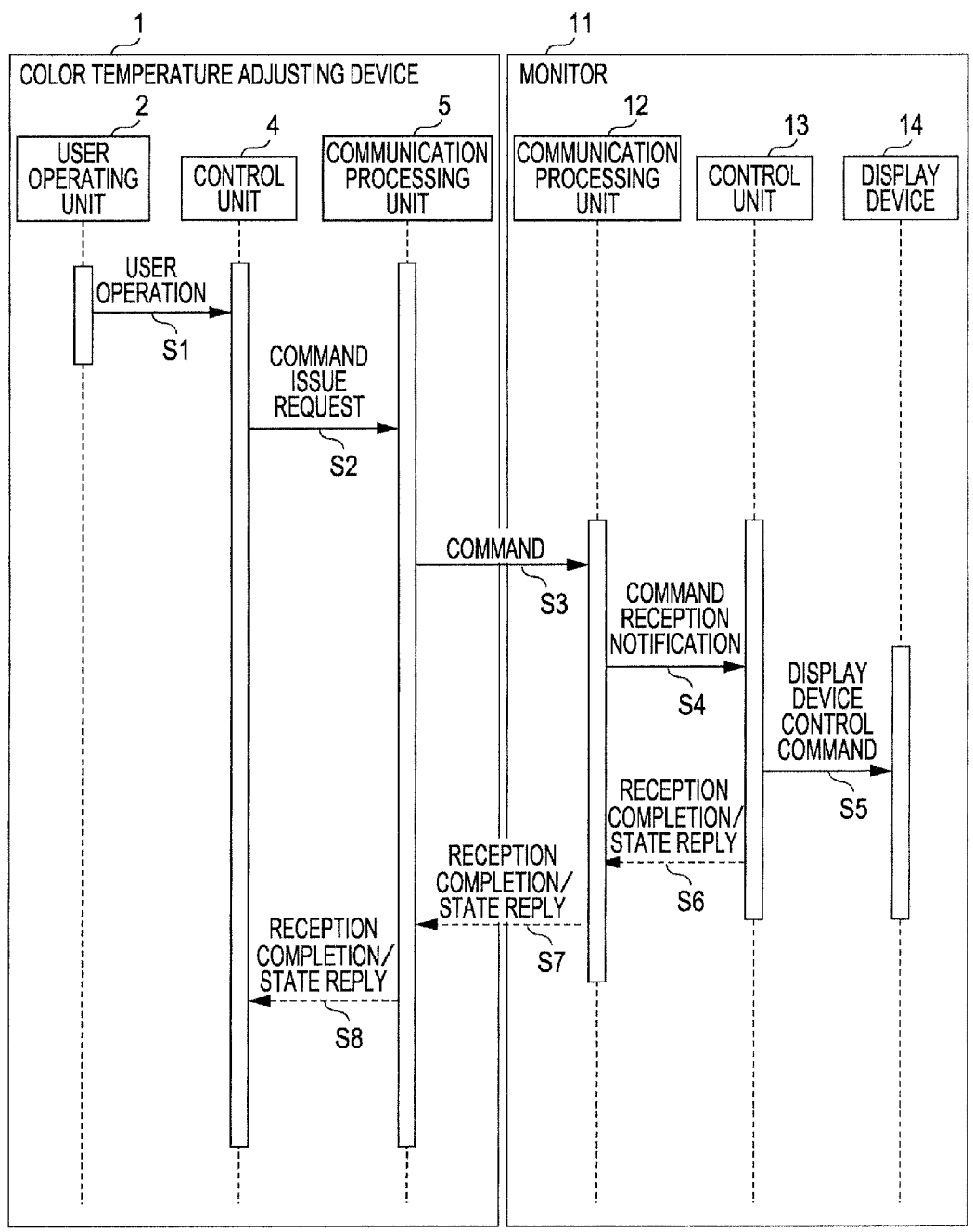
FIG. 5 is a sequence diagram showing an example of transition of command transmission of the color temperature adjusting device and reply according to the embodiment of the present invention.

FIG. 5 illustrates a communication flow between the color temperature adjusting device 1 and the monitor 11.

First, a user performs a predetermined operation with the user operating unit 2 (step S1) and the user operating unit 2 performs an operational instruction to the control unit 4. The control unit 4 transmits a command issue request that requests to issue a command for controlling the monitor 11 to the communication processing unit 5 based on the received operational instruction (step S2).

The communication processing unit 5 issues a command for controlling an operation of the monitor 11 based on the command issue request received from the control unit 4 and transmits the command to the LAN 8 (step S3).

When the communication processing unit 12 of the monitor 11 receives the command from the color temperature adjusting device 1 through the LAN 8, the communication processing unit 12 transmits a command reception notification to the control unit 13 (step S4). The control unit 13 transmits a display device control command for controlling the display device 14 to the display device 14 based on the command reception notification received from the communication processing unit 12 (step S5). Thus, the control unit 13 transmits the display device control command to the display device 14, whereby the display device 14 is controlled by the color temperature adjusting device 1.

Further, when the control unit 13 receives the command reception notification from the communication processing unit 12, the control unit 13 sends a reply to the communication processing unit 12 (step S6). The reply includes a reception completion notification for notifying that the display device control command is issued to the display device 14 and a reply for notifying a current state of the display device 14 (abbreviated below as "state reply"). The communication processing unit 12 transmits the reception completion notification and the state reply that are received from the control unit 13 to the LAN 8 (step S7).

When the communication processing unit 5 of the color temperature adjusting device 1 receives the reception completion notification and the state reply through the LAN 8, the communication processing unit 5 transmits the reception completion notification and the state reply to the control unit 4 (step S8). Accordingly, the control unit 4 can recognize a current state of the display device 14 and can update a display content with respect to the GUI display unit 3.

Figure 6:
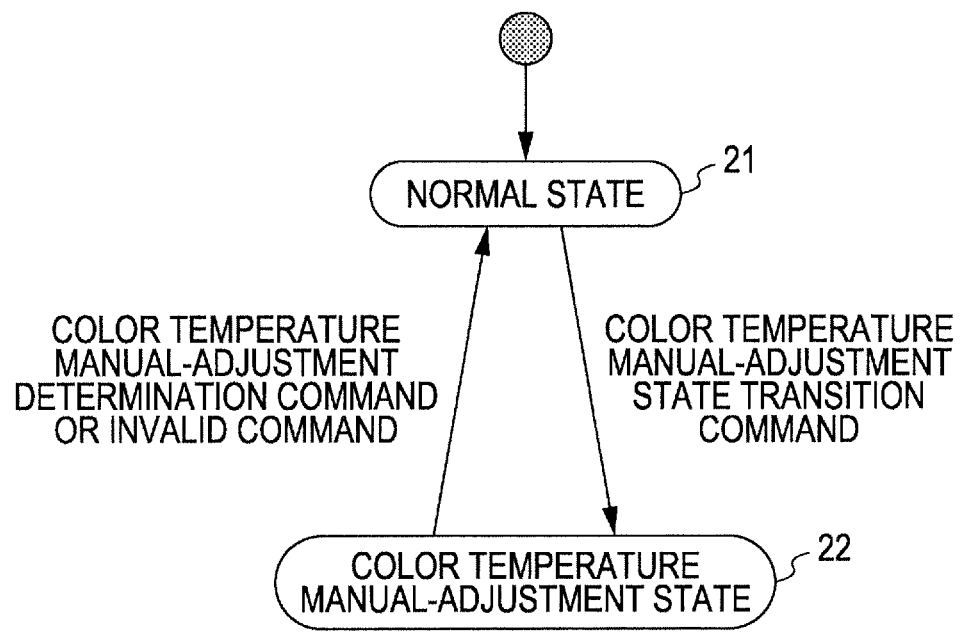
FIG. 6 illustrates an example of state transition when the color temperature adjusting device adjusts chromaticity of the monitor according to the embodiment of the present invention.

FIG. 6 illustrates a state transition between a normal state and a color temperature manual-adjustment state.

When the monitor 11 receives a command from the color temperature adjusting device 1, the monitor 11 transits from a normal state 21 for only displaying an image to a specific state for adjusting a color temperature of an image which is displayed. An example of the specific state is a color temperature manual-adjustment state 22 in which a user can manually adjust a color temperature with the user operating unit 2 as described in this embodiment.

For the transmission of a command from the color temperature adjusting device 1 to the monitor 11, the following conditions are defined. Unless the following conditions are satisfied, the command is not executed.

Condition 1: A command to transit the monitor 11 from the normal state 21 to the color temperature manual-adjustment state 22 is called a "color temperature manual-adjustment state transition command".

The color temperature manual-adjustment state transition command is not accepted unless the monitor 11 is in the normal state 21. Therefore, when the monitor 11 does not accept the color temperature manual-adjustment state transition command, an error is returned to the color temperature adjusting device 1 as an execution result, and when the monitor 11 accepts the command, a normal execution is returned as the result.

Condition 2: A command to determine an adjusted color temperature is called a "color temperature manual-adjustment determination command", and a command to cancel the adjusted color temperature and return to an original color temperature is called an "invalid command".

The color temperature manual-adjustment determination command and the invalid command are not accepted unless the monitor 11 is in the color temperature manual-adjustment state 22. When the "color temperature manual-adjustment determination command" or the "invalid command" is issued, the monitor 11 transits from the color temperature manual-adjustment state 22 to the normal state 21.

Condition 3: A command to set chromaticity and luminance in the display device 14 is called a "chromaticity luminance setting command".

The chromaticity luminance setting command is not accepted unless the monitor 11 is in the color temperature manual-adjustment state 22.

Here, when the monitor 11 receives the color temperature manual-adjustment state transition command from the color temperature adjusting device 1, the monitor 11 transits from the normal state 21 to the color temperature manual-adjustment state 22 (Condition 1). Then, when color temperature adjustment of the display device 14 is determined, the color temperature adjusting device 1 issues the color temperature manual-adjustment determination command (Condition 2) and the monitor 11 transits from the color temperature manual-adjustment state 22 to the normal state 21. In a similar manner, when the color temperature adjustment of the display device 14 is made invalid, the color temperature adjusting device 1 issues an invalid command (Condition 2) and the monitor 11 transits from the color temperature manual-adjustment state 22 to the normal state 21. At this time, the color temperature adjustment of the display device 14 becomes invalid, and the display device 14 displays an image of the original color temperature.

Figure 7:
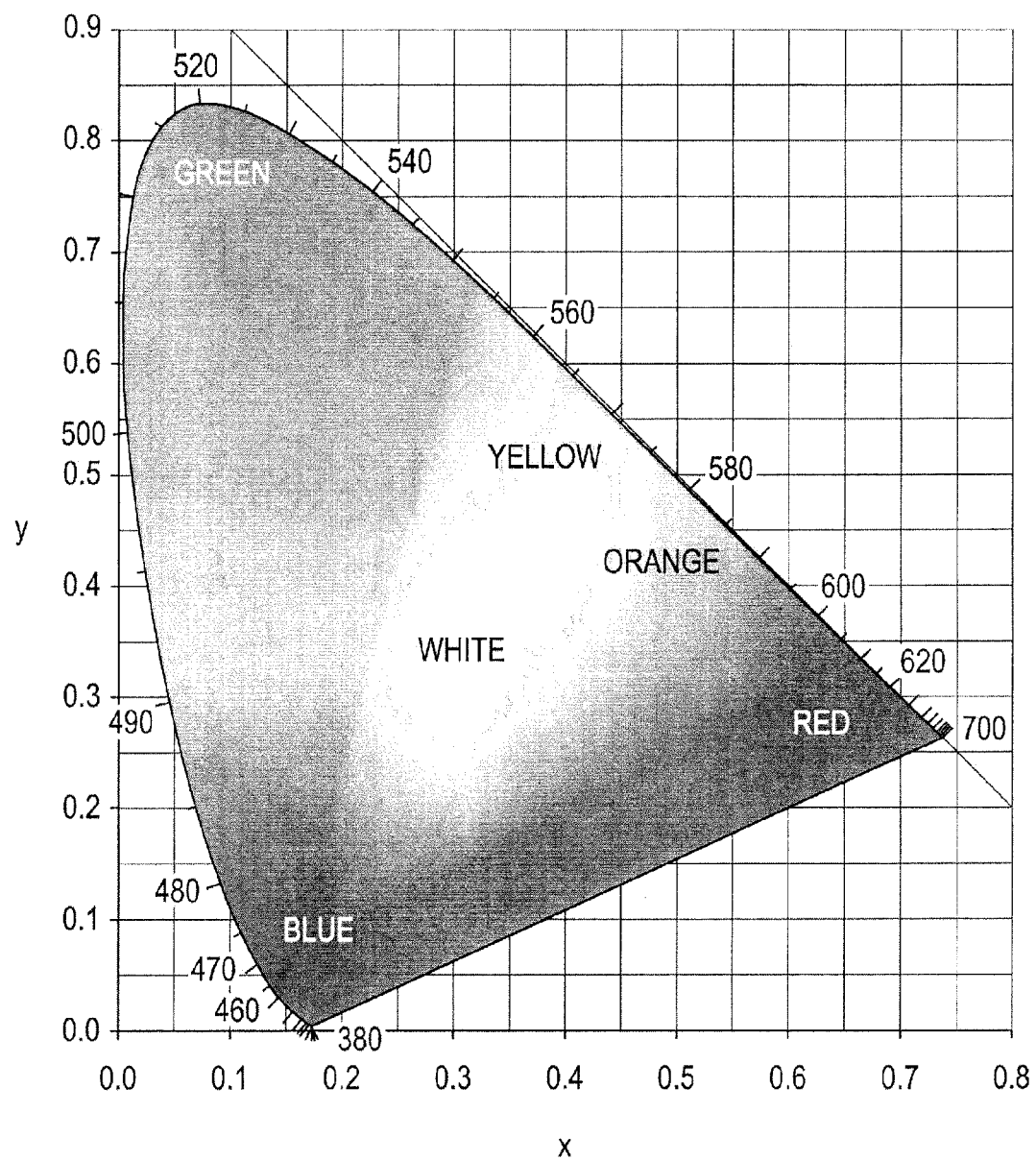
FIG. 7 is an xy chromaticity diagram in a CIE color coordinate system.

FIG. 7 is an xy chromaticity diagram in a CIE color coordinate system.

The CIE color coordinate system is a color coordinate system which is defined by CIE. The xy chromaticity diagram two-dimensionally shows an X, Y, Z color system. CIE is an abbreviated name of Commission Internationale de l'Eclairage (http://www.cie.co.at/index_ie.html). There is also CIE Japan (http://www.ciejapan.or.jp/indexl.html). Values given on a triangle boundary line drawn by connecting chromaticity points of three primary colors in the xy chromaticity diagram denote a wavelength of a plain color.

X, Y, and Z are parameters denoting the following contents.
X: an amount of light which is felt as red (stimulus value that a human feels)
Y: an amount of light which is felt as green (stimulus value that a human feels)
Z: an amount of light which is felt as blue (stimulus value that a human feels)

Three stimulus values X, Y, and Z are respectively normalized by a reflection ratio of light. The normalization is defined by CIE, so that the detailed description is skipped. Coordinates x and y of chromaticity are obtained from the values. Calculation formulas are shown below. However, results obtained from the following formulas have no unit of quantity.

$$x = X/(X+Y+Z)$$

$$y = Y/(X+Y+Z)$$

Figure 8:
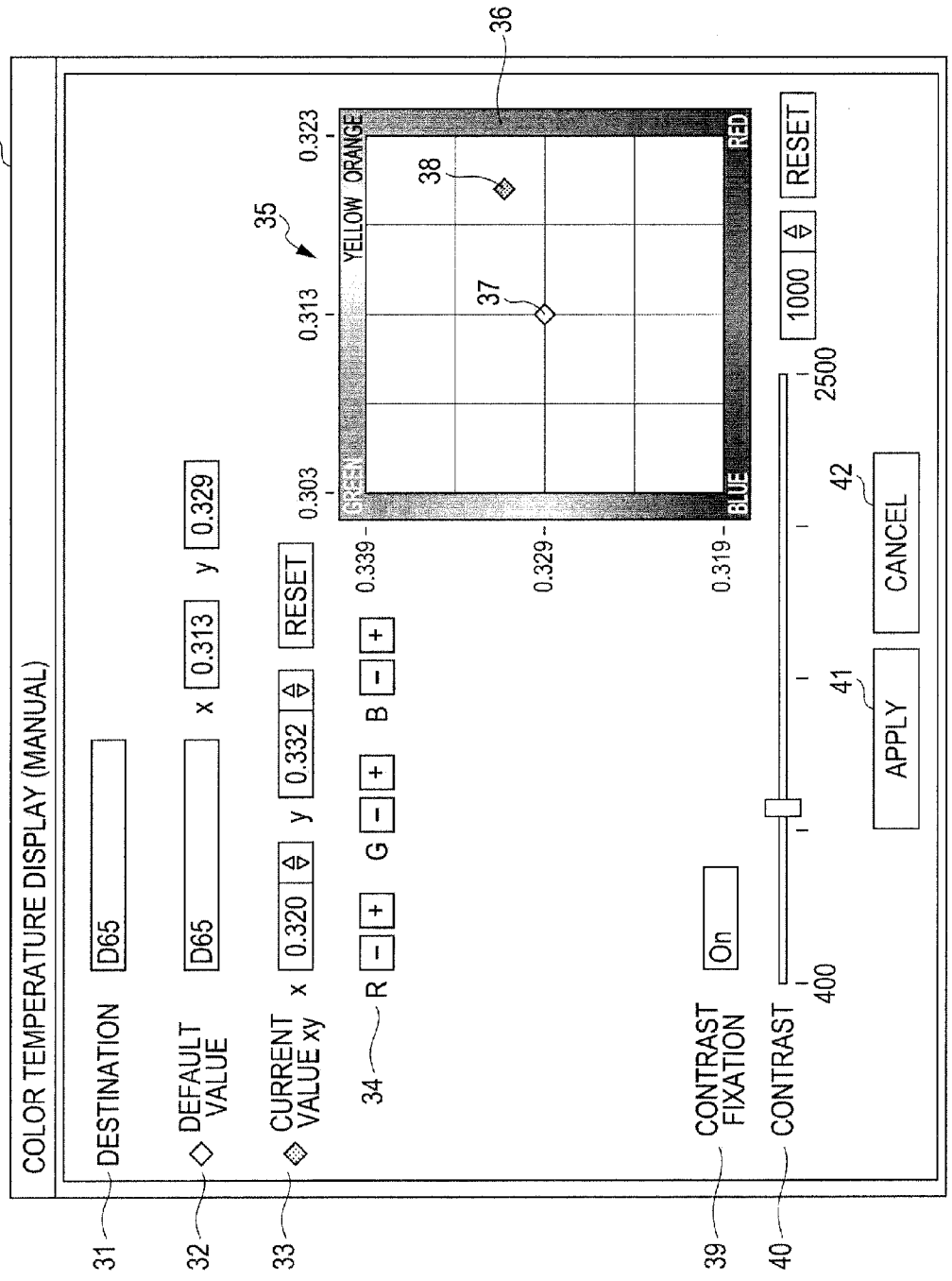
FIG. 8 illustrates an example of a color temperature manual-adjustment setting screen according to the embodiment of the present invention.

FIG. 8 illustrates an example of the color temperature manual-adjustment setting screen 30 displayed on the GUI display unit 3.

The color temperature manual-adjustment setting screen 30 includes a display section 31 and a default value display section 32. The display section 31 displays which destination is selected in the monitor 11 among destinations storing setting values of color temperatures. The default value display section 32 displays a default value of a color temperature immediately after a start of display of the monitor 11. Here, a destination represents a parameter which stores values of the chromaticity x, y and the luminance Y which are preliminarily registered for setting a color temperature of the monitor 11. For example, when a destination is "D65", values of the chromaticity x, y and the luminance Y at which a color temperature of the monitor 11 is 6500 K are read out from the storage unit 15. Then, the default value display section 32 displays the selected destination and the values of the chromaticity x, y which are determined depending on the selected destination.

The color temperature manual-adjustment setting screen 30 further includes a current value setting section 33 and an RGB setting section 34 with which values of RGB can be manually changed. The current value setting section 33 is used for setting the x coordinate and the y coordinate of the second pointer 38, which will be described later, and displays these coordinates during adjustment of a color temperature. Coordinate values of the second pointer 38 are set such that coordinate values are increased or decreased by pressing an up-pointing or down-pointing triangular button shown in the current value setting section 33. Further, the RGB setting section 34 is provided in response to a demand for adjusting a color temperature of the monitor 11 by setting RGB as related art. A user can perform an increase/decrease operation of values by the current value setting section 33 and the RGB setting section 34 by using the user operating unit 2.

The color temperature manual-adjustment setting screen 30 further includes a color temperature display region 35 and a frame 36 which is disposed around the color temperature display region 35 and has a predetermined coloration. On the frame 36, names of colors to be displayed are displayed for convenience. In the color temperature display region 35, a first pointer 37 is displayed. The first pointer 37 indicates a default value based on a destination which is set at the default value display section 32, that is, default values of the chromaticity x, y denoting a color temperature which is set before a start of adjustment of a color temperature (default state). Further, in the color temperature display region 35, the second pointer 38 is displayed. The second pointer 38 indicates a value in adjustment which is changed at the current value setting section 33, that is, an adjustment value of the chromaticity x, y of the monitor 11 of which a color temperature is adjusted. The first pointer 37 and the second pointer 38 are displayed in the color temperature display region 35 in a manner to correspond to scales of an x coordinate and a y coordinate marked on the frame 36.

The color temperature manual-adjustment setting screen 30 further includes a contrast fixation button 39 and a contrast adjustment section 40. The contrast fixation button 39 is used for instructing a start of adjustment of a contrast of backlight (not shown) provided to the monitor 11. The contrast adjustment section 40 is used for adjusting a contrast of the monitor 11. Here, to adjust a contrast is synonymous with to adjust the luminance Y of the monitor 11.

The color temperature manual-adjustment setting screen 30 further includes an APPLY button 41 for applying values displayed on the current value setting section 33 to the monitor 11 and a CANCEL button 42 for canceling adjustment of a color temperature. When a setting of the contrast fixation button 39 is "On", the luminance Y of the backlight is fixed and does not change.

On the other hand, when the setting of the contrast fixation button 39 is "Off", the luminance Y of the backlight can be adjusted by changing a value of the contrast adjustment section 40 with the user operating unit 2. The contrast adjustment section 40 has a track bar and a spin box. These two GUI objects become operable when the setting of the contrast fixation button 39 is "Off". In this case, when a user operates the track bar or the spin box with the user operating unit 2, the luminance Y of the backlight included in the monitor 11 can be adjusted. That is, the luminance Y of the monitor 11 can be arbitrarily adjusted by operating either of the track bar or the spin box.

For example, in an operation of the track bar, a user moves the track bar to a desired contrast value with a mouse, and the control unit 4 issues a chromaticity basic setting command at the moment that the user releases his or her finger from the mouse. In an operation of the spin box, when the user directly sets a value and the user presses Enter key of a keyboard, the control unit 4 issues the chromaticity basic setting command. Alternatively, when the user clicks an up button or a down button with the mouse, the control unit 4 issues the chromaticity basic setting command. Here, the track bar and the spin box simultaneously operate one-on-one, and when a value of the luminance Y is changed by either of them, the value is transmitted to the monitor 11. However, the value of the luminance Y does not influence values of the chromaticity x, y. Then, the control unit 4 sends out the value of the luminance Y which is adjusted at the contrast adjustment section 40 by an operation of the user operating unit 2 to the monitor 11 together with an adjustment value denoted by the chromaticity x, y. Then, when the luminance Y of the monitor 11 is changed, the control unit 4 receives the value of the luminance Y set in the monitor 11 from the monitor 11 through the communication processing unit 5.

In the meantime, in the color temperature adjusting device 1 of the embodiment, a color temperature can be adjusted merely by supplying only values of the chromaticity x, y to the monitor 11. However, as for the backlight of the monitor 11, not only the chromaticity x, y but also the luminance Y can be adjusted. Therefore, it is set such that the luminance Y of the monitor 11 can be also adjusted by the contrast fixation button 39 and the contrast adjustment section 40.

In related art, a user has adjusted a color temperature of the monitor 11 by directly changing values of RGB, but the user has not recognized which color direction the user adjusts the color temperature of the monitor 11. Therefore, the color temperature adjusting device 1 of the embodiment uses a graph which is displayed in the color temperature display region 35 and is expressed by the first pointer 37 and the second pointer 38 of which coordinates are set on x and y axes, as a GUI.

The first pointer 37 is constantly displayed at the center of the graph and a value in adjustment which is acquired from the monitor 11 is displayed by the second pointer 38. The user can change the x coordinate and the y coordinate of the second pointer 38 which is displayed within the frame 36, by operating the user operating unit 2.

Further, colors are displayed on the frame 36 so as to enable direct-adjustment of a color temperature only by chromaticity x, y without a calculation between RGB and the chromaticity x, y, and between RGB and the luminance Y. Specifically, among colors shown in a triangle boundary line drawn by connecting chromaticity points of three primary colors in the xy chromaticity diagram, colors corresponding to an x coordinate and a y coordinate in the xy chromaticity diagram are displayed on the frame 36. Thus, graph indicated by two points is expressed in the color temperature display region 35. Accordingly, the user recognizes a color changing direction between a color temperature before a start of adjustment and a color temperature in adjustment, enhancing recognition of the user. Further, a color temperature can be adjusted by using values of the chromaticity x, y without using relative change values of RGB.

Basically, a value of a color temperature before a start of adjustment does not greatly differ from a color temperature at an end of adjustment. However, when a color temperature is changed largely, scaling is performed on scales marked on the x and y axes on the circumference of the color temperature display region 35. Details of the scaling will be described later with reference to FIGS. 11 to 15.

Figure 9:
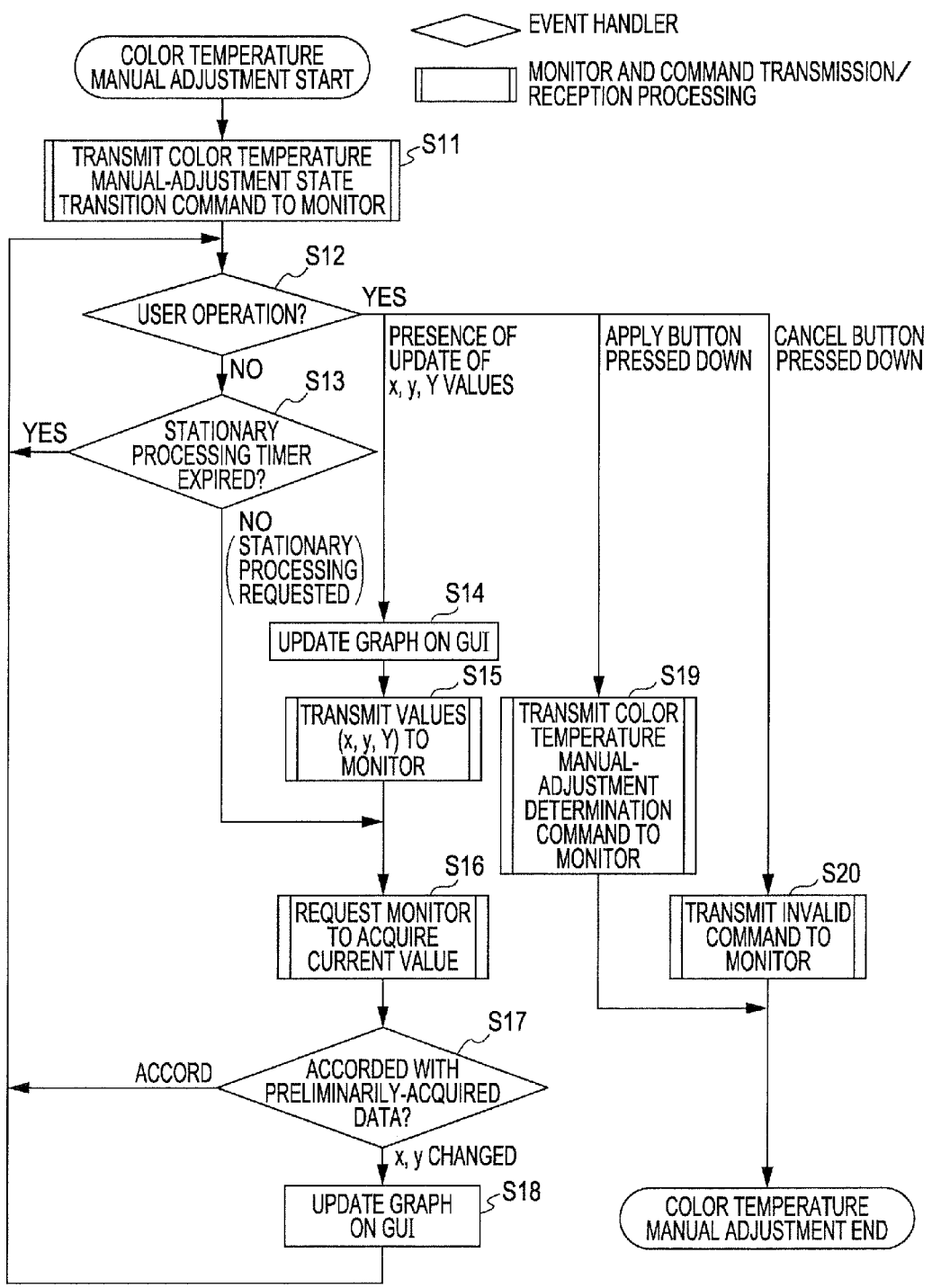
FIG. 9 is a flowchart showing a processing example of the color temperature adjusting device according to the embodiment of the present invention.

FIG. 9 is an example of a flowchart at a color temperature adjusting device 1 side in color temperature manual adjustment.

The color temperature adjusting device 1 has other way to set or adjust values other than color temperature manual adjustment. However, an operation example of the color temperature adjusting device 1 in the color temperature manual-adjustment state 22 is described in the embodiment.

First, the control unit 4 transmits a color temperature manual-adjustment state transition command for instructing a start of adjustment of a color temperature to the monitor 11 (step S11). This command is issued when activation of the color temperature manual-adjustment setting screen 30 is selected from a menu screen (not shown) by a user operation and the color temperature manual-adjustment setting screen 30 is displayed on the GUI display unit 3.

Next, the control unit 4 determines presence/absence of a user operation (step S12). Specifically, the control unit 4 determines presence/absence of an operation signal supplied from the user operating unit 2. When the control unit 4 determines absence of the user operation, the control unit 4 determines presence/absence of stationary processing (step S13). When the control unit 4 determines absence of the stationary processing and checks an elapse of predetermined time by a timer (not shown), the control unit 4 returns the processing to step S12 and determines presence/absence of the user operation again.

When the control unit 4 detects update of values of the chromaticity x, y and the luminance Y, for example, as a user operation in step S12, the control unit 4 updates a display of a graph which is displayed on the GUI display unit 3 (step S14). Subsequently, the control unit 4 transmits the values of the chromaticity x, y and the luminance Y to the monitor 11 (step S15), and requests the monitor 11 to acquire values of the chromaticity x, y and the luminance Y which are currently set (step S16), Next, the control unit 4 compares values of the chromaticity x, y and the luminance Y which have been preliminarily acquired from the monitor 11 and have been set in the monitor 11 to the values of the chromaticity x, y and the luminance Y which are obtained by requesting a change of the chromaticity x, y by the second pointer 38 this time and then acquired from the monitor 11. Then, the control unit 4 determines whether these values are accorded with each other or not (step S17). In a case of accordance, the control unit 4 returns the processing to step S12 and determines presence/absence of the user operation again.

In a case of disaccord, that is, in a case where the chromaticity x, y and the luminance Y of the monitor 11 are changed, the control unit 4 changes a coordinate position of the second pointer 38 displayed on the GUI display unit 3 to a position of the chromaticity x, y which are changed, so as to display the second pointer 38 on the GUI display unit 3 (step S18). Meanwhile, the control unit 4 performs the scaling of the scales marked on the color temperature display region 35 and displays the scales on the GUI display unit 3.

When the control unit 4 detects a press of the APPLY button 41 as a user operation, for example, in step S12, the control unit 4 transmits a color temperature manual-adjustment determination command to the monitor 11 (step S19). By this processing, values of the chromaticity x, y set in a destination which is stored in the monitor 11 is overwritten and updated, and the color temperature manual-adjustment processing is ended.

When the control unit 4 detects a press of the CANCEL button 42 as a user operation, for example, in step 212, the control unit 4 transmits an invalid command to the monitor 11 (step S20), and the color temperature manual-adjustment processing is ended.

Figure 10:
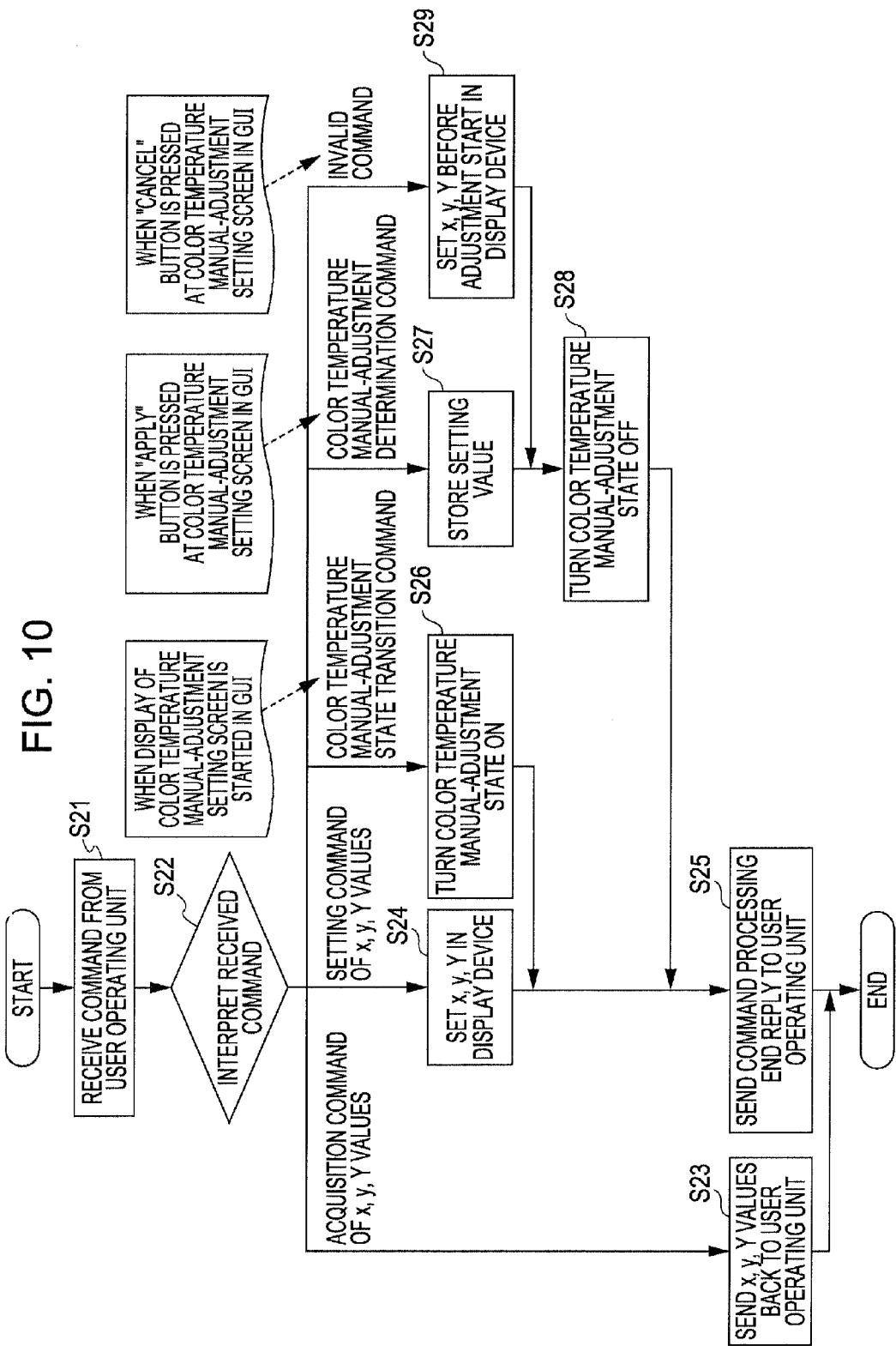
FIG. 10 is a flowchart showing a processing example of the monitor according to the embodiment of the present invention.

FIG. 10 illustrates an example of a flowchart at a monitor 11 side in the color temperature manual adjustment.

The monitor 11 has other way to change setting of a color temperature and the like other than the case where the color temperature is manually adjusted. However, an operation example of the monitor 11 in the color temperature manual-adjustment state 22 is described in the embodiment.

First, the control unit 13 receives a command, which is issued by the control unit 4 in accordance with an operation instruction of the user operating unit 2, through the LAN 8 (step S21), and interprets the received command (step S22).

In a case where the command received by the control unit 13 in step S21 is an "acquisition command of values of chromaticity x, y and luminance Y", the control unit 13 sends back the values of the chromaticity x, y and the luminance Y of the display device 14 to the color temperature adjusting device 1 (step S23).

In a case where the command received by the control unit 13 in step S21 is a "setting command of values of chromaticity x, y and luminance Y", the control unit 13 sets the values of the chromaticity x, y and the luminance Y instructed by the setting command, with respect to the display device 14 (step S24). Then, the control unit 13 sends a reply of an end of the command processing to the color temperature adjusting device 1 (step S25).

In a case where the command received by the control unit 13 in step S21 is a "color temperature manual-adjustment state transition command", the control unit 13 transits the monitor 11 from the normal state 21 to the color temperature manual-adjustment state 22 (step S26). This command is issued when the color temperature manual-adjustment setting screen 30 is displayed by a user. Then, the control unit 13 sends a reply of an end of the command processing to the color temperature adjusting device 1 (step S25).

In a case where the command received by the control unit 13 in step S21 is a "color temperature manual-adjustment determination command", the control unit 13 stores the setting value in a storage unit (not shown) provided to the monitor 11 (step S27). This command is issued when the APPLY button 41 is pressed by a user. Then, the control unit 13 turns the color temperature manual-adjustment state 22 to be off (step S28), and sends a reply of an end of the command processing to the color temperature adjusting device 1 (step S25).

In a case where the command received by the control unit 13 in step S21 is an "invalid command", the control unit 13 sets values of the chromaticity x, y and the luminance Y before a start of adjustment of the color temperature in the display device 14 (step S29). This command is issued when the CANCEL button 42 is pressed by a user at the color temperature manual-adjustment setting screen 30. Then, the control unit 13 turns the color temperature manual-adjustment state 22 to be off (step S28), and sends a reply of an end of the command processing to the color temperature adjusting device 1 (step S25).

FIGS. 11 to 15 illustrate an example of the scaling of scales of a graph.

Figure 11:
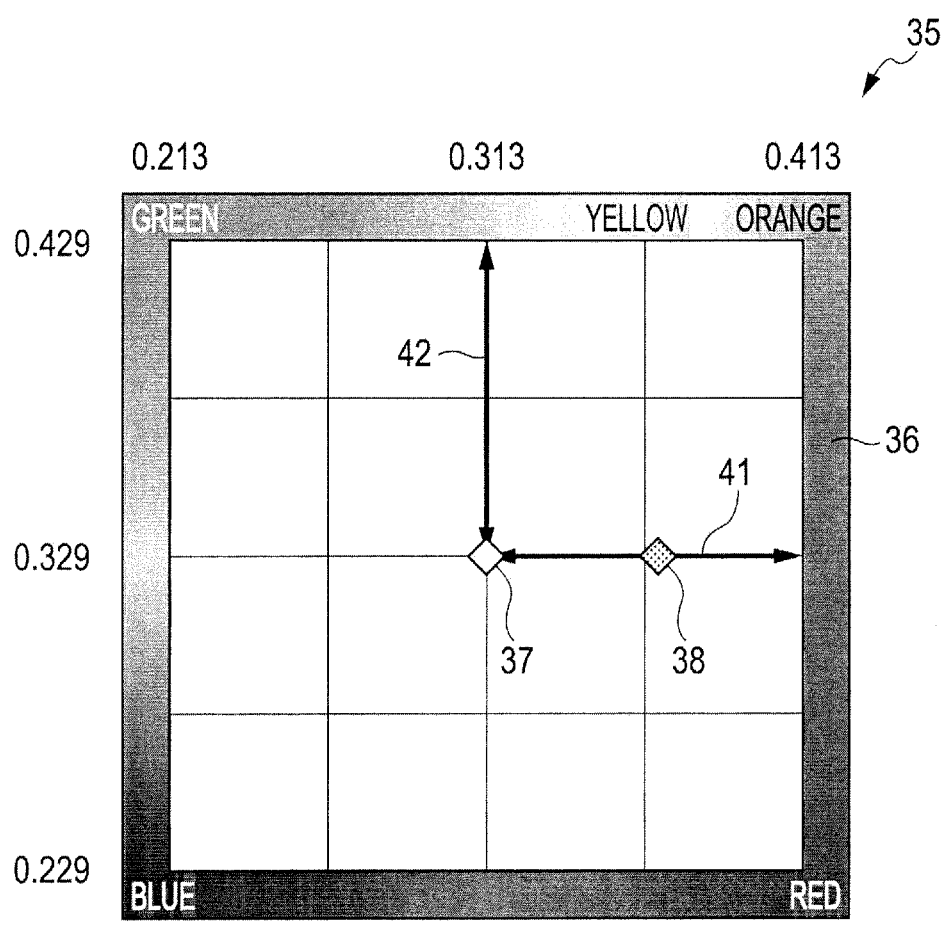
FIG. 11 illustrates examples of a frame and first and second pointers according to the embodiment of the present invention.

FIG. 11 illustrates an example of an enlarged view of the color temperature display region 35.

FIG. 11 shows that scales are displayed on an upper part and a left part of a graph drawn in the color temperature display region 35 and a center of the graph (a part on which the first pointer 37 is displayed, in the example) is fixed at all times. However, when a user desires to move the second pointer 38 so as to adjust current values x and y to values which are largely different from default values, a display range of the color temperature display region 35 is scaled. At this time, the control unit 4 performs control to perform scaling of the scales of the x coordinate and the y coordinate marked on the frame 36 in accordance with an amount of displacement of the second pointer 38 with respect to the first pointer 37 and display the first pointer 37 and the second pointer 38 within the frame 36.

Here, double-pointed arrows 41 and 42 which are the reference of the scaling are shown in the color temperature display region 35. The length of the double-pointed arrows 41 and 42 shown in FIG. 11 is "0.1".

In the scaling, the length of the double-pointed arrows 41 and 42 can be changed as "0.01", "0.02", "0.05", "0.1", "0.2", or "0.5". For example, in consideration of only an x direction, the x axis is scaled so as to enable a graph display of the double-pointed arrow 41 in the minimum range of the length of the double-pointed arrow 41 which is obtained by current value x—default value x, in the color temperature display region 35. Further, in order to show the execution of the scaling in the x axis direction, values to be displayed as scales are recalculated in reference to the default value indicated by the first pointer 37 and are displayed.

Figure 12:
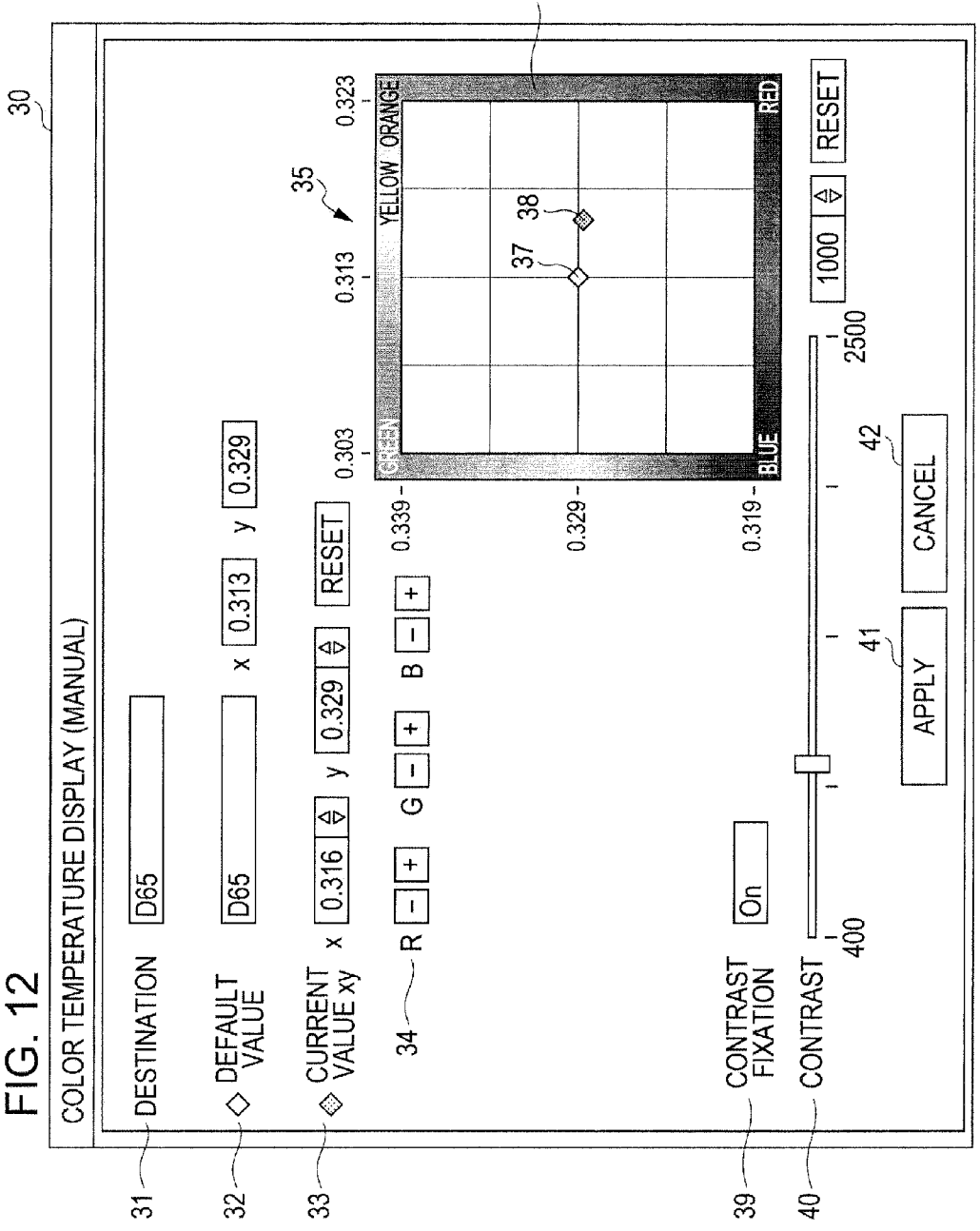
FIG. 12 illustrates an example of the color temperature manual-adjustment setting screen according to the embodiment of the present invention.

FIG. 12 illustrates a display example of a graph in a case where a reference of the scaling is "0.01".

In this case, a display range of the x axis is from 0.303 to 0.323, and a display range of the y axis is from 0.319 to 0.339.

Figure 13:
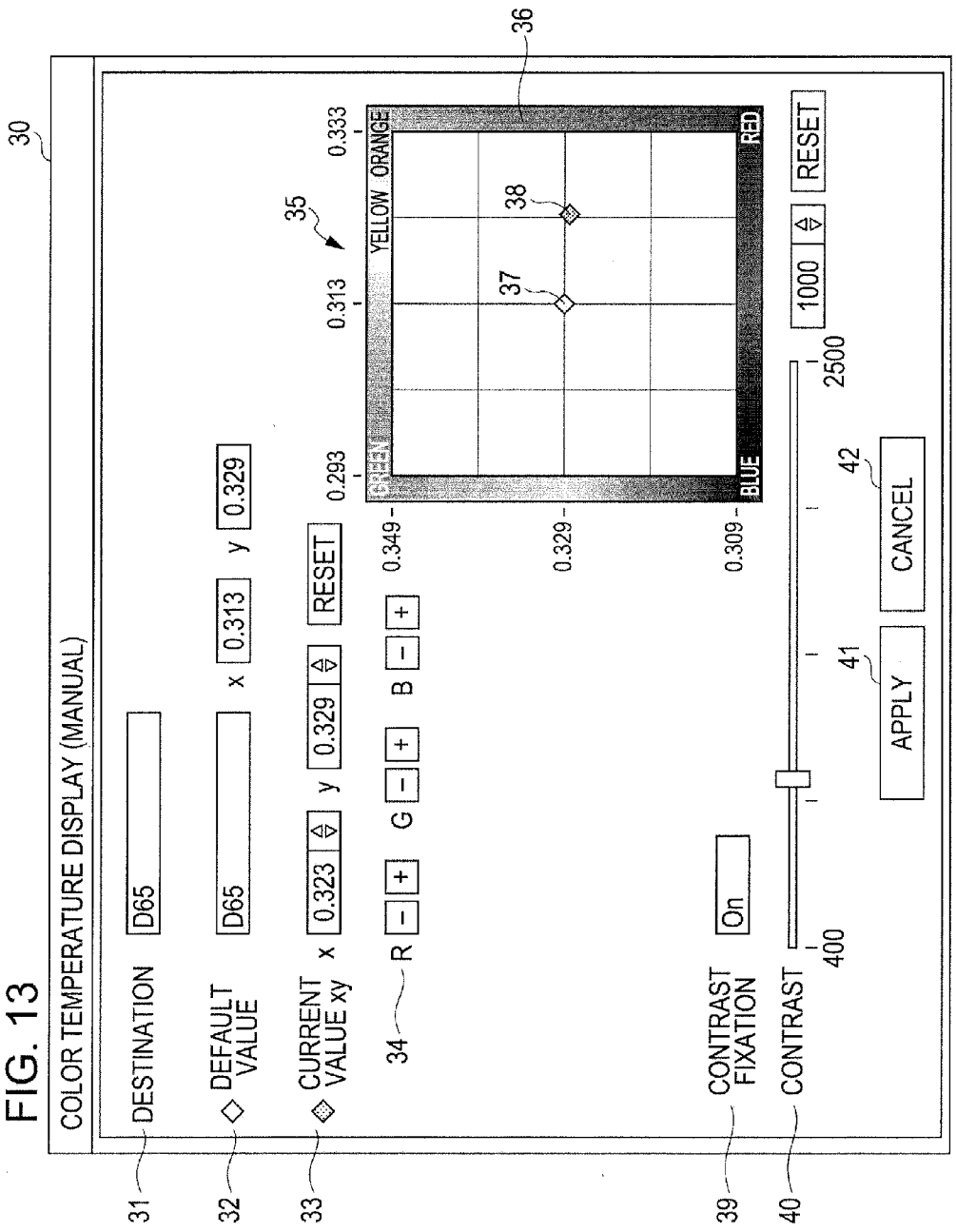
FIG. 13 illustrates an example of the color temperature manual-adjustment setting screen according to the embodiment of the present invention.

FIG. 13 illustrates a display example of a graph in a case where a reference of the scaling is "0.02".

In this case, a display range of the x axis is from 0.293 to 0.333, and a display range of the y axis is from 0.309 to 0.349. That is, the length between the current value and the default value shown in FIG. 12 is extended in the x axis direction, so that the display ranges of the x and y axes are also enlarged compared to the display ranges shown in FIG. 12.

Figure 14:
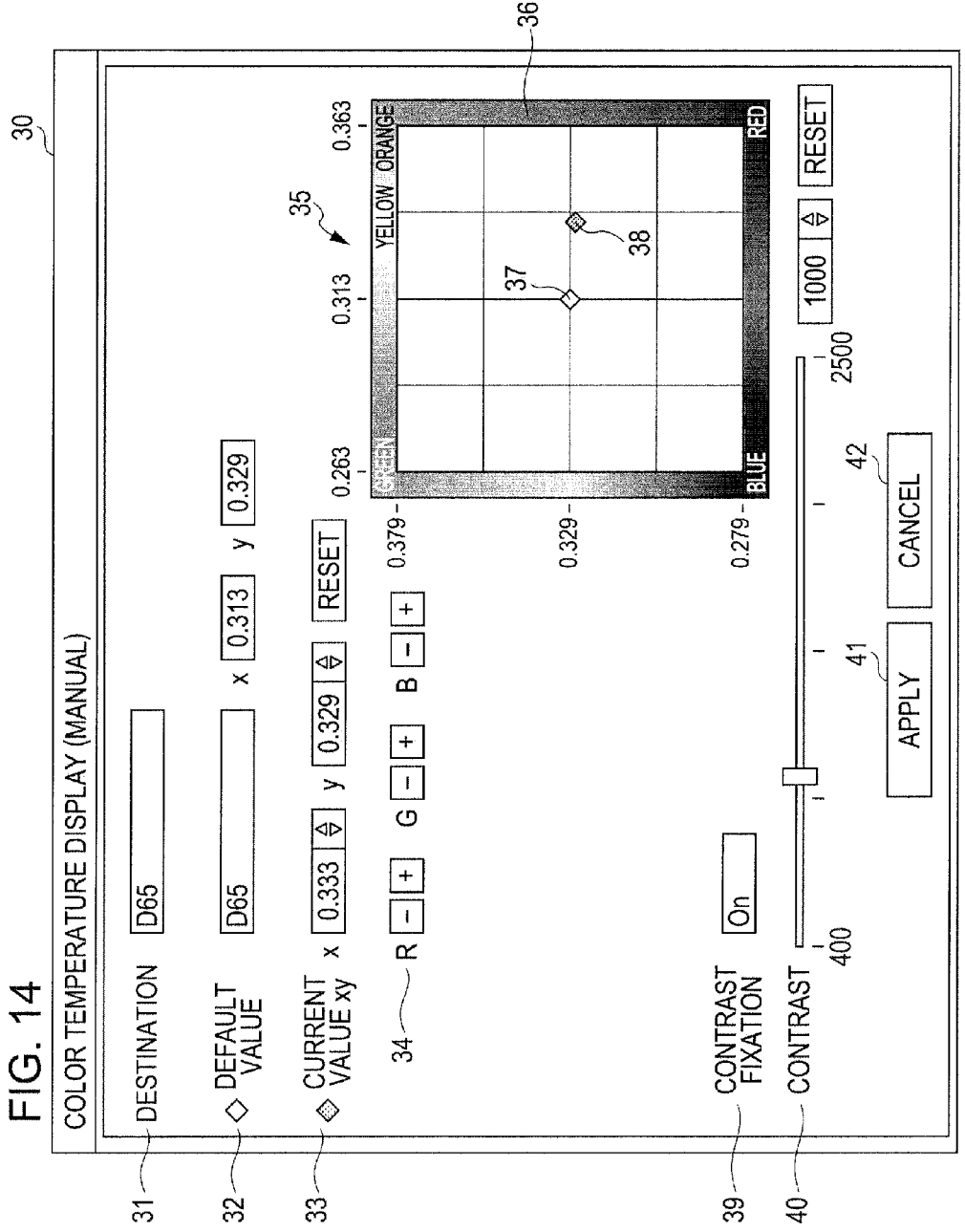
FIG. 14 illustrates an example of the color temperature manual-adjustment setting screen according to the embodiment of the present invention.

FIG. 14 illustrates a display example of a graph in a case where a reference of the scaling is "0.05".

In this case, a display range of the x axis is from 0.263 to 0.363, and a display range of the y axis is from 0.279 to 0.379. That is, the length between the current value and the default value shown in FIG. 13 is extended in the x axis direction, so that the display ranges of the x and y axes are also enlarged compared to the display ranges shown in FIG. 13.

FIG. 15 illustrates a display example of a graph in a case where a reference of the scaling is "0.1".

In this case, a display range of the x axis is from 0.213 to 0.413, and a display range of the y axis is from 0.229 to 0.429. That is, the length between the current value and the default value shown in FIG. 14 is extended in the x axis direction, so that the display ranges of the x and y axes are also enlarged compared to the display ranges shown in FIG. 14.

As shown in FIGS. 12 to 15, the x axis is scaled in accordance with a transfer of the second pointer 38 which shows a current value, and the y axis is also scaled in a similar manner. Further, the case where the amount of displacement of the second pointer 38 is large and the display range of the x axis is enlarged is described above, but the scaling is similarly performed in a case where the second pointer 38 is transferred closer to the first pointer 37 and the display ranges of the x and y axes are narrowed.

According to the color temperature adjusting system 10, which is described above, of the embodiment of the present invention, a graph showing a value of a color temperature which is in adjustment is displayed on the GUI display unit 3 included in the color temperature adjusting device 1, and colors shown within a triangle curve drawn on the xy chromaticity diagram are arranged on the frame 36. Then, the first pointer 37 which indicates chromaticity before a start of adjustment is disposed at the central point of the graph and the second pointer 38 indicating chromaticity x, y in adjustment obtained by inputting a current value is moved independently, thus displaying the graph on the GUI display unit 3. Accordingly, when a user manually adjusts a color temperature of the monitor 11 by using chromaticity values, graph display of the chromaticity set in the monitor 11 is enabled, whereby the user easily recognizes a directional property of a color. Further, values of the chromaticity x, y displayed on the display device 14 are directly operated without performing a matrix calculation from values of RGB to the chromaticity x, y and the luminance Y, being able to facilitate the adjustment of a color temperature.

Further, the first pointer 37 before adjustment and the second pointer 38 in adjustment are simultaneously displayed in the graph. By referring to colors arranged on the frame disposed at a circumference of the graph in such state, a user can adjust a color temperature only by changing values of the chromaticity x, y without an operation of values of RGB which takes time, whereby the user hardly feels stress.

Further, when the user operates with the user operating unit 2, the display device 14 promptly reflects a changed color temperature and therefore the control unit 4 can continuously issue a command, enhancing operability. On the other hand, it is not necessary for the control unit 13 included in the monitor 11 to perform a matrix calculation which imposes a calculation load. Accordingly, there is no demand for selecting a high-cost calculation device having high calculation-capability such as a CPU and a DSP, being able to reduce a cost of the monitor 11.

<2. Modification>

In the above-described embodiment, coordinate values shown in the current value setting section 33 are changed to change values of the chromaticity x, y, thus transferring the second pointer 38. However, a user may drag and drop the second pointer 38 with a mouse or the like included in the user operating unit 2 so as to move the second pointer 38. Alternatively, a touch-panel display may be used in the GUI display unit 3 and a user may directly touch a screen so as to transfer the second pointer 38. At this time, the current value setting section 33 may be permitted to reflect x and y coordinate values of the second pointer 38 which is transferred, whereby the user recognizes a coordinate position of the second pointer 38.

Further, the color temperature display region 35 may be formed to be black and the first pointer 37 and the second pointer 38 may be respectively displayed by a light color such as white. Accordingly, the user easily recognizes coordinate positions of the first pointer 37 and the second pointer 38.

Further, in the above-described embodiment, the color temperature display region 35 and the frame 36 have a rectangular shape, but the shape is not limited to rectangle. The color temperature display region 35 and the frame 36 may have a circular shape, an oval shape, or a polygonal shape, for example, thus being able to be transformed to have an arbitral shape which enhances recognition of the user.

Further, the series of processing in the example of the above-described embodiment can be executed by hardware, but may be executed by software as well. In a case where the series of processing is executed by software, the series of processing can be executed by a computer in which a program configuring the software is installed in specialized hardware or a computer in which a program for executing various functions is installed. For example, the series of processing may be executed by a general-purpose personal computer in which a program configuring desired software is installed.

Further, a storage medium that stores a program code of software for realizing functions of the above-described embodiment may be provided to the system or the device. Needless to say, the functions can be realized by reading out and executing the program code stored in the storage medium by the system or a computer of the device (or a control device such as a CPU).

Examples of the storage medium for supplying the program code in this case include a floppy Disk®, a hard disc, an optical disk, a magnet-optical disk, a CD-ROM, a CD-R, a magnetic tape, a nonvolatile memory card, and a ROM.

Further, the functions of the above-described embodiment are realized by executing the program code which is read out by the computer. In addition, an OS or the like operating in the computer executes a part or the whole of real processing based on an instruction of the program code. A case where the functions of the above-described embodiment are realized by the processing is also included.

The present application contains subject matter related to that disclosed in Japanese Priority Patent Application JP 2009-244577 filed in the Japan Patent Office on Oct. 23, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A color temperature adjusting device, comprising:
a display unit configured to display a first pointer indicating default values of chromaticity x, y denoting a color temperature that is set in a default state of a monitor that displays an image and a second pointer indicating an adjustment value of the chromaticity x, y of the monitor in which the color temperature is adjusted within a frame that displays colors corresponding to an x coordinate and a y coordinate in an xy chromaticity diagram among colors shown in an inside of a triangle boundary line drawn by connecting chromaticity points of three primary colors in the xy chromaticity diagram, in a corresponding manner to scales of the x coordinate and the y coordinate marked on the frame;
an operating unit configured to be used for changing the x coordinate and/or the y coordinate of the second pointer displayed within the frame; and
a control unit configured to send out the adjustment value indicated by the second pointer, the x coordinate and/or the y coordinate of which are/is changed by an operation of the operating unit, to the monitor through a communication processing unit, and in a case where the monitor changes the color temperature based on the values of the chromaticity x, y set by the adjustment value, receive the values of the chromaticity x, y set in the monitor from the monitor through the communication processing unit so as to reflect and display the values of the chromaticity x, y received from the monitor on the display unit, as values of the chromaticity x, y set in the monitor that is in adjustment.

2. The color temperature adjusting device according to claim 1, wherein
the display unit displays a contrast adjustment section for adjusting a contrast of the monitor; and
in a case where luminance Y of the monitor that is adjusted by the contrast adjustment section by an operation of the operating unit is changed, the control unit sends out a value of the luminance Y to the monitor together with the adjustment value indicated by the chromaticity x, y, and receives the value of the luminance Y set in the monitor from the monitor through the communication processing unit.

3. The color temperature adjusting device according to claim 1, wherein the control unit performs such control that the control unit compares the values of the chromaticity x, y, the values being set in the monitor and acquired from the monitor, to the values of the chromaticity x, y that are changed by the second pointer, and in a case where these values are different from each other, the control unit changes and displays a coordinate position of the second pointer, the second pointer being displayed within the frame, on the display unit.

4. The color temperature adjusting device according to claim 3, wherein the control unit performs such control that the control unit performs scaling of scales of the x coordinate and the y coordinate marked on the frame in accordance with a displacement amount of the second pointer with respect to the first pointer so as to display the first pointer and the second pointer within the frame.

5. A method for adjusting a color temperature comprising the steps of:

changing an x coordinate and/or a y coordinate of a second pointer displayed within a frame in a case where a first pointer indicating default values of chromaticity x, y denoting a color temperature that is set in a default state of a monitor that displays an image and the second pointer indicating an adjustment value of the chromaticity x, y of the monitor in which the color temperature is adjusted are displayed within the frame, the frame displaying colors corresponding to the x coordinate and the y coordinate in an xy chromaticity diagram among colors shown in an inside of a triangle boundary line drawn by connecting chromaticity points of three primary colors in the xy chromaticity diagram, on a display unit in a corresponding manner to scales of the x coordinate and the y coordinate marked on the frame;

sending out the adjustment value indicated by the second pointer, the x coordinate and/or the y coordinate of which are/is changed, to the monitor through a communication processing unit;

receiving the values of the chromaticity x, y set in the monitor from the monitor through the communication processing unit in a case where the monitor changes the color temperature based on the values of the chromaticity x, y set by the adjustment value; and reflecting and displaying the values of the chromaticity x, y received from the monitor on the display unit as values of the chromaticity x, y set in the monitor that is in adjustment.

6. A non-transitory storage medium storing an executable program that instructs a computer to execute a procedure, the procedure comprising:

changing an x coordinate and/or a y coordinate of a second pointer displayed within a frame in a case where a first pointer indicating default values of chromaticity x, y denoting a color temperature that is set in a default state of a monitor that displays an image and the second pointer indicating an adjustment value of the chromaticity x, y of the monitor in which the color temperature is adjusted are displayed within the frame, the frame displaying colors corresponding to the x coordinate and the y coordinate in an xy chromaticity diagram among colors shown in an inside of a triangle boundary line drawn by connecting chromaticity points of three primary colors in the xy chromaticity diagram, on a display unit in a corresponding manner to scales of the x coordinate and the y coordinate marked on the frame;

sending out the adjustment value indicated by the second pointer, the x coordinate and/or the y coordinate of which are/is changed by an operation of an operating unit, to the monitor through a communication processing unit;

receiving the values of the chromaticity x, y set in the monitor from the monitor through the communication processing unit in a case where the monitor changes the color temperature based on the values of the chromaticity x, y set by the adjustment value; and reflecting and displaying the values of the chromaticity x, y received from the monitor on the display unit as values of the chromaticity x, y set in the monitor that is in adjustment.

* * * * *